(12) United States Patent
Nakano et al.

(10) Patent No.: US 7,896,557 B2
(45) Date of Patent: Mar. 1, 2011

(54) NEEDLE ROLLER BEARING

(75) Inventors: Yoshiyasu Nakano, Kikugawa (JP); Shinji Oishi, Iwata (JP); Katsufumi Abe, Iwata (JP); Yugo Yoshimura, Iwata (JP); Noriaki Fujii, Wako (JP); Keiko Yoshida, Wako (JP)

(73) Assignees: NTN Corporation, Osaka (JP); Honda Motor Co., Ltd., Tokyo (JP)

( * ) Notice: Subject to any disclaimer, the term of this patent is extended or adjusted under 35 U.S.C. 154(b) by 798 days.

(21) Appl. No.: 11/886,084

(22) PCT Filed: Mar. 13, 2006

(86) PCT No.: PCT/JP2006/304907
§ 371 (c)(1),
(2), (4) Date: Sep. 11, 2007

(87) PCT Pub. No.: WO2006/098276
PCT Pub. Date: Sep. 21, 2006

(65) Prior Publication Data
US 2008/0181549 A1    Jul. 31, 2008

(30) Foreign Application Priority Data
Mar. 14, 2005 (JP) .............................. 2005-070383
Jun. 29, 2005 (JP) .............................. 2005-190522

(51) Int. Cl.
*F16C 33/60* (2006.01)
*F16C 43/06* (2006.01)
(52) U.S. Cl. ................... 384/570; 384/559; 29/898.062

(58) Field of Classification Search .................. 384/523, 384/526, 559, 570, 576, 577, 582; 29/898.062
See application file for complete search history.

(56) References Cited

U.S. PATENT DOCUMENTS

| 1,491,721 A | | 4/1924 | Munson | |
|---|---|---|---|---|
| 1,644,611 A | * | 10/1927 | Rieffert | .................... 384/501 |
| 1,821,873 A | | 9/1931 | Best | |
| 1,921,488 A | | 8/1933 | Smith | |
| 2,668,743 A | * | 2/1954 | Zeuzem | .................... 384/457 |
| 3,399,008 A | * | 8/1968 | Farrell et al. | ................ 384/577 |
| 3,446,542 A | * | 5/1969 | Whitehurst | ................. 384/477 |
| 3,883,194 A | | 5/1975 | Pitner | |
| 4,397,507 A | * | 8/1983 | Kraus et al. | ................. 384/576 |

(Continued)

FOREIGN PATENT DOCUMENTS

CN    2338536    9/1999

(Continued)

*Primary Examiner*—Marcus Charles
(74) *Attorney, Agent, or Firm*—Clark & Brody

(57) ABSTRACT

A needle roller bearing comprises an outer ring having a split part in a circumferential direction, a plurality of rollers which can roll along an inner diameter surface of the outer ring, and a cage holding the plurality of rollers. The outer ring has an engaging click protruding inward along a diameter at a width-direction end thereof to prevent the cage from moving in an axial direction.

25 Claims, 20 Drawing Sheets

U.S. PATENT DOCUMENTS

| | | | |
|---|---|---|---|
| 4,550,479 A * | 11/1985 | Walter et al. | 29/898.066 |
| 4,708,498 A * | 11/1987 | Labedan et al. | 384/570 |
| 4,820,062 A * | 4/1989 | Shirane | 384/486 |
| 4,993,849 A | 2/1991 | Radinger et al. | |
| 5,184,899 A * | 2/1993 | Harimoto | 384/560 |
| 5,836,700 A | 11/1998 | Wilkie et al. | 384/480 |
| 6,261,005 B1 | 7/2001 | Winkler et al. | |
| 6,474,875 B1 * | 11/2002 | Waseda et al. | 384/582 |

FOREIGN PATENT DOCUMENTS

| | | |
|---|---|---|
| DE | 37 41 774 | 6/1989 |
| DE | 94 00 643 | 3/1994 |
| EP | 0 013 628 | 7/1980 |
| GB | 1 433 953 | 4/1976 |
| JP | 49-057239 | 6/1974 |
| JP | 4-087020 | 7/1992 |
| JP | 4-357325 | 12/1992 |
| JP | 10-237620 | 9/1998 |
| JP | 2002-525533 | 8/2002 |
| WO | 2005/078297 | 8/2005 |

* cited by examiner

Step "a"  Step "b"  Step "c"

NEEDLE ROLLER BEARING

TECHNICAL FIELD

The present invention relates to a needle roller bearing which supports a crankshaft, a camshaft, a balance shaft, a rocker shaft and the like for a car engine, and more particularly, to a split type needle roller bearing having an outer ring member split by a split line extending in an axial direction of the bearing.

BACKGROUND ART

Conventionally, as a device for supporting a crankshaft, a camshaft, a balance shaft, a rocker shaft and the like for a car engine, a split type roller bearing is used in general. Since the roller bearing has high load capacity, it is suitable for a bearing used under high load circumstances.

However, as a fuel-efficient car is increasingly demanded in view of environment, a needle roller bearing is used instead of the roller bearing recently in some cases. As compared with the roller bearing, although the needle roller bearing is low in load capacity, since its friction resistance is low at the time of rotating, its rotation torque or a feeding amount of lubricant to a supporting part can be reduced.

However, it is difficult to incorporate the normal needle roller bearing as the supporting device for the above shafts in structure. FIG. 1 shows a general car crankshaft. As can be clear from FIG. 1, a needle roller bearing to support a crank pin 2 of a crankshaft 1 cannot be press-fitted in the axial direction. Therefore, as the supporting device for the above shafts, a needle roller bearing only comprising rollers and a split type cage is used. The needle roller bearing having such constitution includes a two-split type in which a cage is split at two positions in a circumferential direction and a one-split type in which a cage is split at one position in a circumferential direction. In addition, although the split type cage is formed of an iron material or a resin material in general, it is known that the one-split type cage is easily formed of the resin material as compared with the iron material.

Furthermore, there is a needle roller bearing which comprises an outer ring, a plurality of rollers arranged along a circumferential direction so as to roll on an inner diameter surface of the outer ring, and a cage holding the rollers (Japanese Patent No. 3073937, for example). According to such needle roller bearing provided with the outer ring, since the roller is in contact with the outer ring linearly, high load capacity and high rigidity can be provided despite its bearing projected area is small. Therefore, this type of needle roller bearing is widely used in various fields including a car. The outer ring in the above case includes a solid outer ring manufactured by a machining process, and a shell type outer ring manufactured by a pressing process.

U.S. Pat. No. 1,921,488 discloses a needle roller bearing in which a cage is a split type and an outer ring is also a split type (half shells). FIG. 2 is a view showing the outer ring disclosed in U.S. Pat. No. 1,921,488. As shown in FIG. 2, the outer ring of the needle roller bearing formed of a cold rolled steel plate (SPC material) and the like is split by a split line 4c extending in an axial direction of the bearing and has two outer ring members 4a and 4b. Thus, it can be incorporated in a crank pin.

FIG. 3 is a view showing a needle roller bearing 6 disclosed in Japanese National Publication No. 2002-525533 of International Application. The needle roller bearing 6 supports a shaft 5 and it comprises an outer ring 7, a plurality of needle rollers 8 arranged on an orbit surface of the outer ring 7 so that they can roll thereon, and a cage 9 holding the needle rollers 8. According to the needle roller bearing 6, the cage 9 is prevented from being shifted in an axial direction by reducing a diameter at both ends of the bearing of the shaft 5 so that the cage 9 protrudes inward along a diameter.

According to the split type needle roller bearing disclosed in the Japanese Patent No. 3073937 or the U.S. Pat. No. 1,921,488, the bearing is disassembled into the outer ring and the rollers with the cage or into the outer ring, the cage and the rollers during transportation to a user in some cases. In this case, they have to be assembled again on the user side carefully. In addition, the disassembled bearing part could be lost.

According to the needle roller bearing disclosed in the Japanese National Publication No. 2002-525533 of International Application, since a structure for axial positioning is provided between the cage and the outer ring, or between the cage and the shaft, the bearing parts can be prevented from being disassembled during transportation. However, since a sectional configuration of the cage is specific, a configuration of an injection mold of the cage and steps for molding the cage become complicated and its cost is high.

Since load is deflected to a predetermined direction in the crankshaft 1 shown in FIG. 1 and the like during rotation, the outer ring of the bearing comprises a region in which the load is concentrated (referred to as the "load region" hereinafter), and a region in which great load is not applied (referred to as the "non-load region" hereinafter). Thus, when the outer ring of the needle roller bearing shown in FIG. 2 is set in the shaft, the boundary 4c of the outer ring members 4a and 4b is to be positioned in the non-load region.

However, since the outer ring members 4a and 4b are only fixed by being fit in a housing, when the outer ring members 4a and 4b receive load during the rotation, they could be rotated and displaced in the housing. At this time, when the boundary 4c of the outer ring members 4a and 4b is moved to the load region, a rotation defect of the needle roller could be caused or the outer ring members 4a and 4b could be damaged and the like.

In addition, according to the needle roller bearing 6 shown in FIG. 3 and the like, since a process for the shaft 5 to prevent the cage 9 from being shifted in the axial direction is needed, its processing cost is increased. Furthermore, in a case where cage controlling means 9a is too small, when large axial load is applied, the cage 9 could fall off. Meanwhile, in a case where the cage controlling means 9a is too strong, it could interfere in the shaft 5.

Furthermore, since the cool rolled steel plate (SPC material) used in the outer ring members 4a and 4b contains as low as 0.04% to 0.15% by weight of carbon, workability is high but quenching ability is low. Thus, in order to secure hardness (Hv 653 or more) required for the surface of the outer ring members 4a and 4b on which the rollers roll, a carburized nitriding process is needed. However, an equipment of the carburized nitriding process is expensive as compared with other heat treatment equipments, and a deep carburized layer is not formed in the cool rolled steel plate having a low carbon content, so that its surface could be peeled off and the like while the bearing is used.

DISCLOSURE OF THE INVENTION

It is an object of the present invention to provide a split type needle roller bearing which can be easily assembled and manufactured at low cost.

It is another object of the present invention to provide a needle roller bearing which can prevent an outer ring from rotating in a housing and comprises means for preventing a cage from moving in an axial direction and to provide a needle roller bearing which comprises an inexpensive and long-lived outer ring member.

It is still another object of the present invention to provide a needle roller bearing comprising means for preventing a cage from moving in an axial direction without performing any process for a peripheral structure in order to prevent the cage from being shifted in the axial direction.

A split type needle roller bearing according to the present invention comprises an outer ring having a split part in a circumferential direction, a plurality of rollers which can roll along an inner diameter surface of the outer ring, and a cage holding the plurality of rollers, and it is characterized in that the outer ring has an engaging click protruding inward along a diameter at a width-direction end thereof to prevent the cage from moving in an axial direction.

According to the needle roller bearing having the above constitution, since the engaging click protrudes from side edge of the outer ring toward the inner diameter side and comes in contact with a width surface of the cage, the outer ring and the cage are not disassembled in the axial direction during transportation after the bearing is manufactured. In addition, when the bearing is set in the shaft, since the engaging click positions the cage with respect to the outer ring in the axial direction, it can be easily set. Although the configuration of the outer ring becomes complicated because the engaging click is provided, the engaging click can be easily added to the outer ring by employing an appropriate manufacturing method. Since the engaging click is provided, it is not necessary to provide a part for positioning in the cage, so that the cage is simple in configuration and it can be easily manufactured. Furthermore, the shaft can be also simple in configuration. Thus, while the needle roller bearing has a function to position the cage, it can be manufactured at low cost. Furthermore, as compared with a case where a structure for positioning is provided in the cage which rotates, when the engaging click for positioning is provided in the outer ring which is a fixed member, an energy loss associated with the rotation can be reduced.

According to one embodiment, the outer ring has a cylindrical configuration having no flange, and the engaging click is provided at a part of the side edge of the outer ring extending circumferentially. When the engaging click is provided at a part in the circumferential direction, flow of lubrication oil is not hindered by the engaging click.

Preferably, the engaging click is provided at a position suitable for retaining the lubrication oil staying in the outer ring. In this respect, according to one embodiment, the engaging click is provided at a lowermost position of the bearing when it is used.

For example, the cage is formed of a resin, and a sectional configuration of the cage along the axial direction is almost rectangular. In this case, although pockets to hold the rollers are provided in the circumferential direction, the sectional configuration of the cage at any circumferential part having no pocket is almost rectangular. In the case where the cage is formed of the resin, when the sectional configuration is rectangular, its mold can be simple and molding process is also simple, so that the cage can be easily manufactured at lower cost.

The outer ring may have a positioning projection on its outer diameter surface to engage with a housing for positioning. In this case, the housing to support the split type needle roller bearing may be also a split type. Since the positioning projection is provided on the outer diameter surface of the outer ring, the split type needle roller bearing can be positioned with respect to the housing by engaging the positioning projection of the outer ring with a hole and the like provided in the housing.

The cage may be split at one or two positions in the circumferential direction. When the cage is such split type, its assembling process can be more easy.

A needle roller bearing according to another embodiment of the present invention comprises an outer ring having a plurality of outer ring members split by split lines extending in an axial direction of the bearing, a plurality of needle rollers arranged on an orbit surface of the outer ring so that they can roll thereon, and a cage holding the plurality of needle rollers. The outer ring member has an engaging part engaging with a housing for positioning and an engaging click protruding inward along a diameter at a width-direction end thereof to prevent the cage from moving in the axial direction, in positions shifted from its circumferential center. The outer ring member contains 0.15% to 1.1% by weight of carbon.

According to the above constitution, since the positioning engaging part is provided in the outer ring member, the outer ring can be prevented from rotating in the circumferential direction. Thus, since the boundary of the outer ring member is not moved to the load region, a rotation defect of the needle roller is prevented and the outer ring member is not damaged and the like. In addition, since the engaging click is provided on the width-direction end of the outer ring member, movement of the cage in the axial direction can be prevented without processing a peripheral structure of a shaft and the like.

Furthermore, a material containing 0.15% or more by weight of carbon can provide sufficient hardness (Hv 653 or more) for the outer ring by a carburized quenching process. Since an equipment for the carburized quenching process can be provided at low cost as compared with an equipment for the carburized nitriding process, the needle roller bearing can be manufactured at low cost. Meanwhile, a material containing more than 1.1% by weight of carbon is low in workability, so that it is not suitable for the material for the outer ring member which is manufactured by a pressing process.

The outer ring member may be treated with a high-frequency quenching process or a bright quenching process. Preferably, the outer ring member contains 0.5% to 1.1% by weight of carbon. A material containing 0.5% or more by weight of carbon can provide sufficient hardness by the bright quenching process or the high-frequency quenching process. An equipment for the bright quenching process or the high-frequency quenching process can be provided at low cost as compared with the equipment for the carburized nitriding process or the carburized quenching process and since the high-frequency quenching process does not use gas especially, its equipment is an environment-friendly equipment.

Preferably, the outer ring member has a middle region positioned in its circumferential center to be a load region while the bearing is used, and an end regions positioned its circumferential ends to be non-load regions while the bearing is used, and the engaging part and the engaging click are positioned in the opposed end regions across the middle region.

For example, when the positioning engaging part is formed from the side of an inner diameter surface of the outer ring member by a burring process, the recessed part is formed in its orbit surface and the surface is not flat. When the recessed part is provided in the load region, a trouble such as a rotation defect of the needle roller could be caused when the roller passes on the recessed part. Thus, the engaging part is provided in the end region which is the non-load region to avoid such trouble. Furthermore, since the engaging click is provided also in the end region of the outer ring member, a trouble such as the rotation defect or a damage due to contact between the cage and the engaging click can be prevented.

A needle roller bearing according to still another embodiment comprises an outer ring having a plurality of outer ring members split by split lines extending in an axial direction of the bearing, a plurality of needle rollers arranged on an orbit surface of the outer ring so that they can roll thereon, and a cage holding the plurality of rollers. The outer ring member has an engaging click protruding inward along a diameter at a width-direction end thereof to prevent the cage from moving in the axial direction, and the cage has an abutting part in which surfaces cut in the axial direction abut on each other, and a chamfered part positioned on a width-direction end surface of the abutting part.

According to the above constitution, since the engaging click is provided at the end part of the outer ring member in the width direction, the movement of the cage in the axial direction can be prevented without processing a peripheral structure of a shaft and the like. At this time, when the abutting part of the cage is shifted in the axial direction and the engaging click is caught by the cut surface, the smooth rotation of the bearing could be hindered. Thus, the chamfered part is provided on the width-direction end surface of the abutting part to prevent the engaging click from being caught.

Preferably, the abutting part has fitting parts to prevent the cage from being shifted in the axial direction, and an axial length of the chamfered part in the cut surface is larger than axial allowance of the abutting part. The fitting parts need some allowance in view of manufacturing. However, when one side of the abutting part protrudes in the axial direction due to this allowance, it could be caught by the engaging click. Thus, the axial length of the chamfered part is set to be larger than the axial allowance of the fitting parts to prevent the cage from being caught by the engaging click.

Preferably, a circumferential length of the chamfered part is smaller than a circumferential length of the engaging click. According to the cage having the above constitution, since a recessed part is formed on the width-direction end surfaces of the abutting part due to the chamfered parts on both sides of the cut surfaces, the engaging click could fall in the recessed part. Thus, the circumferential length of the chamfered part is set to be smaller than the circumferential length of the engaging click to prevent the engaging click from falling in the recessed part formed by the chamfered part.

Preferably, the outer ring member has a positioning engaging part which engaging with a housing for positioning, in the position shifted from its circumferential center. According to such constitution, since the engaging part for positioning is provided in the outer ring member, rotation in the circumferential direction and movement in the axial direction of the outer ring can be prevented. Thus, since the boundary of the outer ring member is not moved into the load region, a trouble such as a rotation defect of the needle roller or a damage of the outer ring member can be prevented.

Preferably, the engaging click is arranged over a whole width-direction end of the outer ring member.

A needle roller bearing according to still another embodiment comprises an outer ring having a plurality of outer ring members split by split lines extending in an axial direction of the bearing, a plurality of needle rollers arranged on an orbit surface of the outer ring so that they can roll thereon, and a cage holding the plurality of rollers. The outer ring member comprises an engaging click protruding inward along a diameter at a width-direction end thereof to prevent the cage from moving in the axial direction and a through hole piercing the engaging click.

According to such constitution, the movement of the cage in the axial direction can be prevented without processing a peripheral structure of a shaft and the like. In addition, since the hole piercing the engaging click is provided, compressive stress generated in the engaging click due to the curving process of the outer ring member can be alleviated, so that the outer ring member can be prevented from being deformed when it is manufactured.

Preferably, the engaging click is arranged over a whole width-direction end of the outer ring member. According to such constitution, since the hole to alleviate the compressive stress is provided in the engaging click, the engaging click can be arranged over the whole width-direction end of the outer ring member. As a result, since the cage can be prevented from being caught by the end surface of the engaging click, the rotation defect of the bearing and the like can be prevented.

For example, the hole is a long hole which is long in the circumferential direction. Thus, since the compressive stress generated in the engaging click can be more absorbed, the deformation can be more effectively prevented at the time of manufacturing.

Preferably, the holes are provided at a plurality of positions in the circumferential direction. Thus, even when the engaging click is arranged over the whole width-direction end of the outer ring member, the compressive stress generated in each part of the engaging click in the circumferential direction can be uniformly absorbed.

The plurality of holes may be different in size from each other. For example, the compressive stress applied to the engaging click in the center part of the outer ring member is different from that in both end parts thereof Thus, when a large hole is provided at a part in which the compressive stress is great and a small hole is provided at a part in which the compressive stress is small, the compressive stress generated in each part of the engaging click in the circumferential direction can be uniformly absorbed.

In order to enhance retaining characteristic of the lubrication oil in the outer ring, according to one embodiment of the present invention, the hole is not provided at a region in which the lubrication oil stays in the outer ring.

Preferably, the outer ring member has a positioning engaging part which engaging with a housing for positioning, in a position shifted from its circumferential center. According to such constitution, since the engaging part for positioning is provided in the outer ring member, the outer ring can be prevented from being rotated in the circumferential direction. Thus, since the boundary of the outer ring member is not moved into the load region, a trouble such as a rotation defect of the needle roller or a damage of the outer ring member can be prevented.

A needle roller bearing according to still another embodiment comprises an outer ring having a plurality of outer ring members split by split lines extending in an axial direction of the bearing, a plurality of needle rollers arranged on an orbit surface of the outer ring so that they can roll thereon, a cage holding the plurality of rollers, and an engaging click protruding inward along a diameter at a width-direction end thereof to prevent the cage from moving in the axial direction. A diameter-direction width $w_1$ of the cage and an engaging width $w_2$ between the engaging click and the cage has a relation such that $w_2/w_1 > 0.2$.

According to such constitution, the movement of the cage in the axial direction can be prevented without processing a peripheral structure of a shaft and the like. At this time, when the engaging click is too small, in case that great axial load is applied to the needle roller bearing, the cage could fall off the engaging click. Thus, the above problem can be solved by setting the engaging width $w_2$ between the engaging click and the cage to be larger than 20% of the diameter-direction width $w_1$ of the cage.

Preferably, a diameter-direction clearance between an end of the engaging click and an inner diameter surface of the needle roller bearing is larger than 0.1 mm. In case that the engaging click interferes in the shaft, it could be damaged. Thus, in view of flexibility of the shaft, the clearance between the shaft and the edge of the engaging click is to be 0.1 mm or more.

In addition, the "inner diameter surface of the needle roller bearing" in this specification means a surface connecting the side of an innermost diameter of a rolling surface of the needle roller and it coincides with an outer surface of the rotation shaft supported by the needle roller bearing.

A needle roller bearing according to still another embodiment comprises an outer ring having a plurality of outer ring members split by split lines extending in an axial direction of the bearing, a plurality of needle rollers arranged on an orbit surface of the outer ring so that they can roll thereon, a cage holding the plurality of rollers, and an engaging click protruding inward along a diameter at a width-direction end thereof to prevent the movement of the cage in the axial direction. A surface of the engaging click opposed to the cage has a configuration in which its center part protrudes toward the cage with respect to both ends thereof.

According to such constitution, the movement of the cage in the axial direction can be prevented without processing a peripheral structure of a shaft and the like. At this time, when axial load is applied to the needle roller bearing, the cage could be caught by a corner part of the engaging click to hinder the rotation of the needle roller. Thus, the surface of the engaging click opposed to the cage is constituted such that the center part protrudes toward the cage with respect to both ends, so that the needle roller bearing which can maintain the smooth rotation of the needle rollers can be provided.

For example, the surface of the engaging click opposed to the cage is a curved surface in which a center part protrudes. Alternatively, the surface of the engaging click opposed to the cage has a chamfered part at the both ends. According to such constitution, since the movement of the cage in the axial direction is prevented by the center part, the cage can be effectively prevented from being caught by the corner part.

Preferably, the cage has an abutting part in which surfaces cut in the axial direction abut on each other, and a protruding amount of its center part is larger than axial allowance of the abutting part. The abutting part needs some allowance in view of manufacturing. However, when one of the abutting parts protrudes in the axial direction due to this allowance, the cage could be caught by the corner part of the engaging click. Thus, the protruding amount of the center part is set to be larger than the axial allowance of the abutting part to effectively prevent the cage from being caught by the corner part.

A needle roller bearing according to still another embodiment comprises an outer ring having a plurality of outer ring members split by split lines extending in an axial direction of the bearing, a plurality of needle rollers arranged on an orbit surface of the outer ring so that they can roll thereon, a cage holding the plurality of rollers, and an engaging click protruding inward along a diameter at a width-direction end thereof to prevent the movement of the cage in the axial direction. A thickness "t" of the outer ring member and a base width B of the engaging click has a relation such that $1.0 \leq B/t \leq 4.0$.

According to such constitution, the movement of the cage in the axial direction can be prevented without processing a peripheral part of a shaft and the like.

Here, as a processing method of the outer ring member, it is considered to bend the engaging click in the thickness direction of the plate-shaped outer ring member and then to curve the entire outer ring member at a predetermined curvature, for example. At this time, when the base width of the engaging click is large, rigidity of the base part of the engaging click becomes high, so that the outer ring member could be deformed, that is, it is undulated, for example. Thus, the thickness "t" of the outer ring member and the base width B of the engaging click are set such that $1.0 \leq B/t \leq 4.0$ to prevent the deformation and the like of the outer ring member.

A needle roller bearing according to still another embodiment comprises an outer ring having a plurality of outer ring members split by split lines extending in an axial direction of the bearing, a plurality of needle rollers arranged on an orbit surface of the outer ring so that they can roll thereon, a cage holding the plurality of rollers, and an engaging click protruding inward along a diameter at a width-direction end thereof to prevent the movement of the cage in the axial direction. The engaging click has a base part in the vicinity of the outer ring member, and a guide part preventing the cage from moving in the axial direction, and a width A of the guide part and a width B of the base part has a relation such that $1 \leq A/B \leq 3$.

According to such constitution, the movement of the cage in the axial direction can be prevented without processing a peripheral part of a shaft and the like.

At this time, the guide part needs to satisfy that $1 \leq A/B$ in order to ensure the hardness required to prevent the movement of the cage. Meanwhile, when the width of the guide part is too large as compared with the base part, since the cage could come in contact with the end of the guide part to deform the engaging click while the bearing is rotated, it needs to satisfy that $A/B \leq 3$.

Preferably, the guide part does not come in contact with the outer ring member. When the guide part of the engaging click is too large and comes in contact with the outer ring member, the outer ring member could not be processed. Thus, the width A of the guide part has to be set within a range it does not come in contact with the outer ring member.

According to the present invention, a method of manufacturing a needle roller bearing comprising an outer ring having a plurality of outer ring members split by split lines extending in an axial direction of the bearing, a plurality of needle rollers arranged on an orbit surface of the outer ring so that they can roll thereon, a cage holding the plurality of needle rollers, and an engaging click protruding inward along a diameter at a width-direction end thereof to prevent the cage from moving in an axial direction is such that the engaging click is bent in a thickness direction of the outer ring member in a bending process, and then the outer ring member is curved at a predetermined curvature.

If the outer ring member is curved at the predetermined curvature and then the engaging click is bent, the outer ring member could be deformed when the engaging click is processed. Thus, the engaging click is processed and the outer ring member is curved at the predetermined curvature to solve the above problem.

BEST MODE FOR CARRYING OUT THE INVENTION

Figure 1:
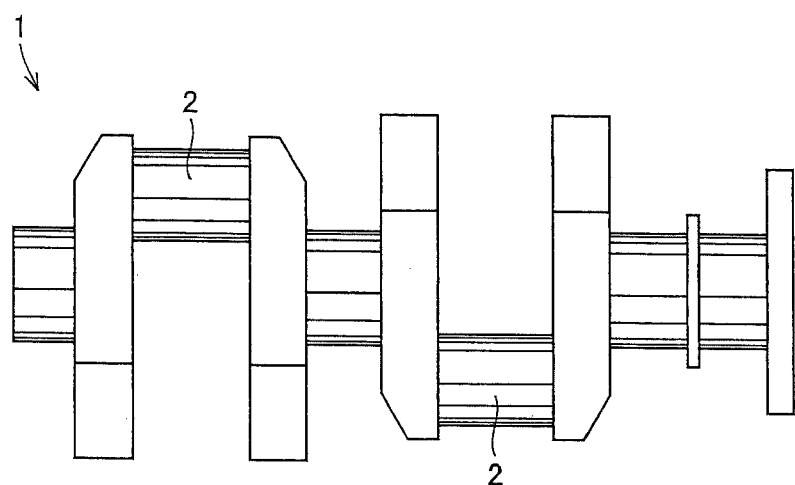
FIG. 1 is a view showing a crankshaft of a car.
Figure 2:
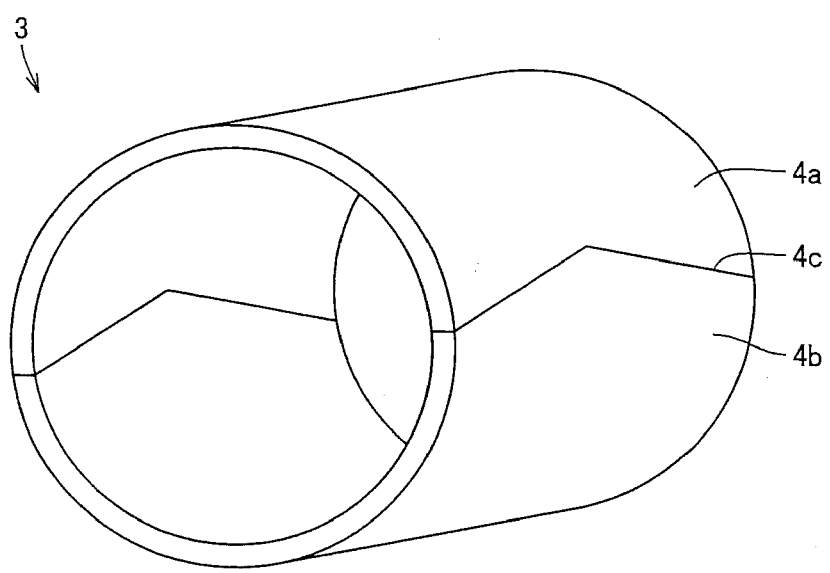
FIG. 2 is a perspective view showing a split type outer ring used in a conventional needle roller bearing.
Figure 3:
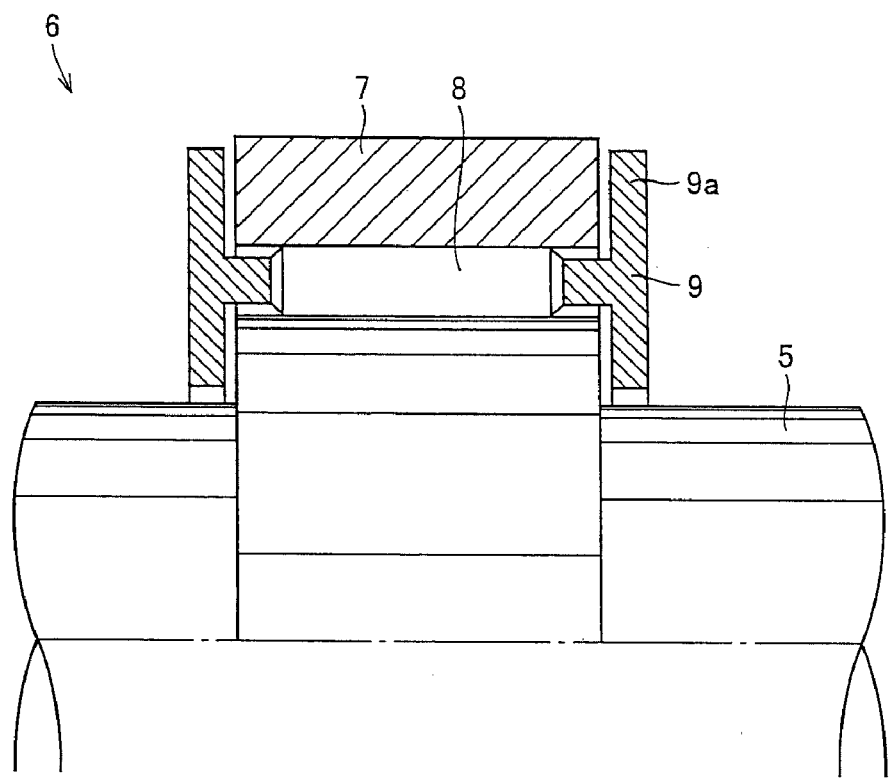
FIG. 3 is a sectional view showing a conventional needle roller bearing comprising means for preventing movement of a cage in an axial direction.
Figure 4A:
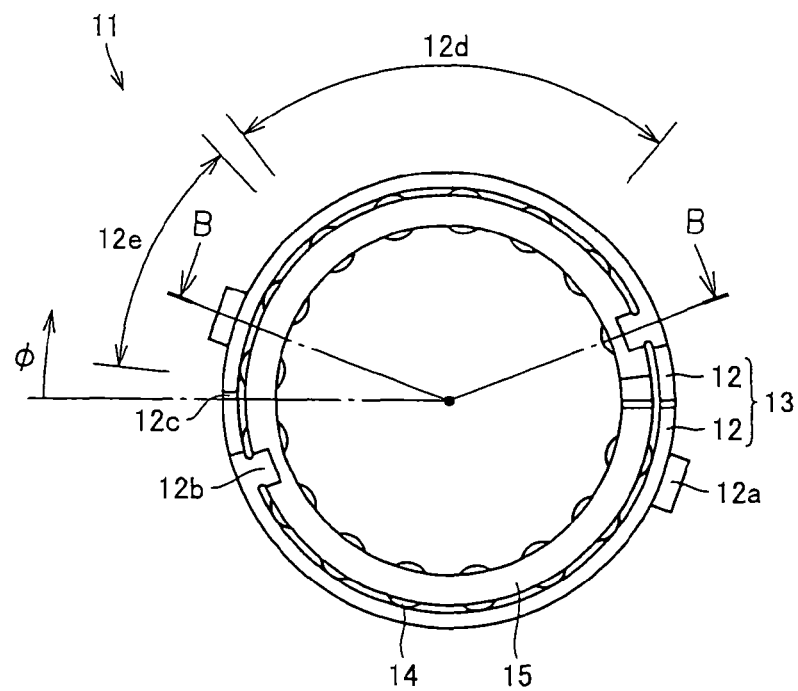
FIG. 4A is a view showing a split type needle roller bearing according to one embodiment of the present invention.
Figure 4B:
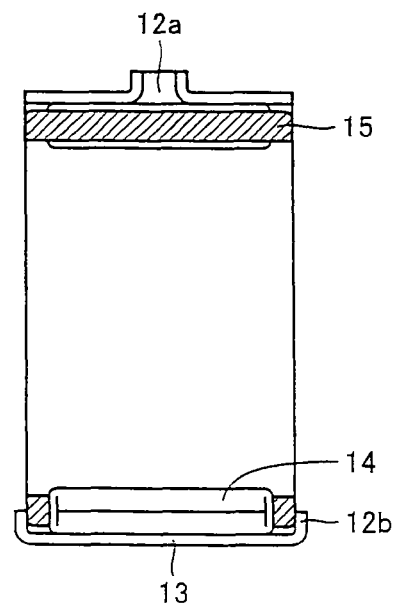
FIG. 4B is a sectional view taken along line B-B in FIG. 4A.

One embodiment of the present invention will be described with reference to FIGS. 4A to 6B hereinafter. As shown in FIGS. 4A and 4B, a needle roller bearing 11 comprises a split type outer ring 13 having two outer ring members 12 split by split lines extending in an axial direction of the bearing, a plurality of needle rollers 14 arranged on an orbit surface of the outer ring 13 so that they can roll thereon, and a cage 15 holding the needle rollers 14.

The outer ring 13 has a cylindrical configuration having no flange, and a plurality of engaging clicks protruding in an inner diameter direction are provided on both edges thereof. These engaging clicks 12b are in contact with a width surface of the cage 15 to position the cage 15 in the axial direction and partially provided in a circumferential direction and each takes the form of a tongue.

Figure 5A:
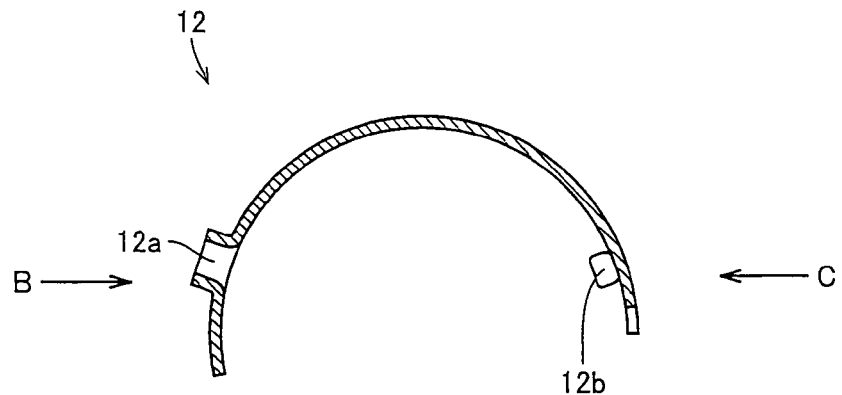
FIG. 5A is a view showing an outer ring member in the split type needle roller bearing.

As shown in FIG. 5A, the outer ring member 12 comprises a projection 12a serving as an engaging part to engage with a housing for positioning, and the engaging click 12b protruding from a width-direction end thereof toward the inner diameter side to prevent the cage 15 from moving in the axial direction, in positions shifted from its circumferential center.

Figure 5B:
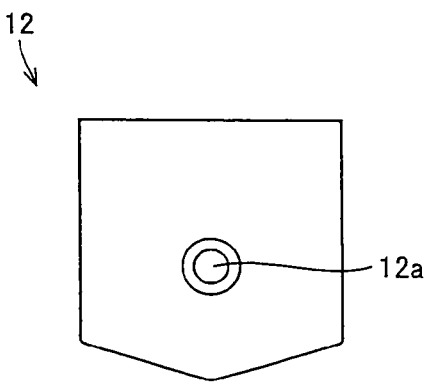
FIG. 5B is a view showing the outer ring member taken in a direction of arrow B in FIG. 5A.
Figure 5C:
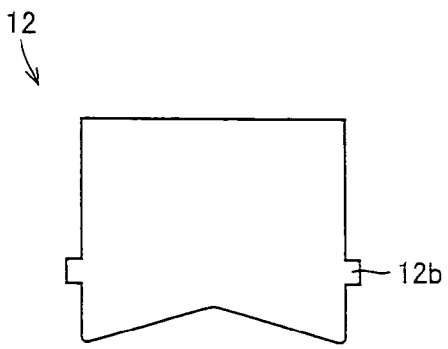
FIG. 5C is a view showing the outer ring member taken in a direction of arrow C in FIG. 5A.

As shown in FIGS. 5B and 5C, one circumferential end of the outer ring member 12 is in the form of V shape and the other circumferential end thereof is in the form of inverted V shape. The cylindrical outer ring 13 is formed by connecting the V-shaped end to the inverted V-shaped end of the two outer ring members 12. Here, as long as the split line can split the outer ring 13 in the circumferential direction, it may not strictly coincide with the axial direction.

Figure 6A:
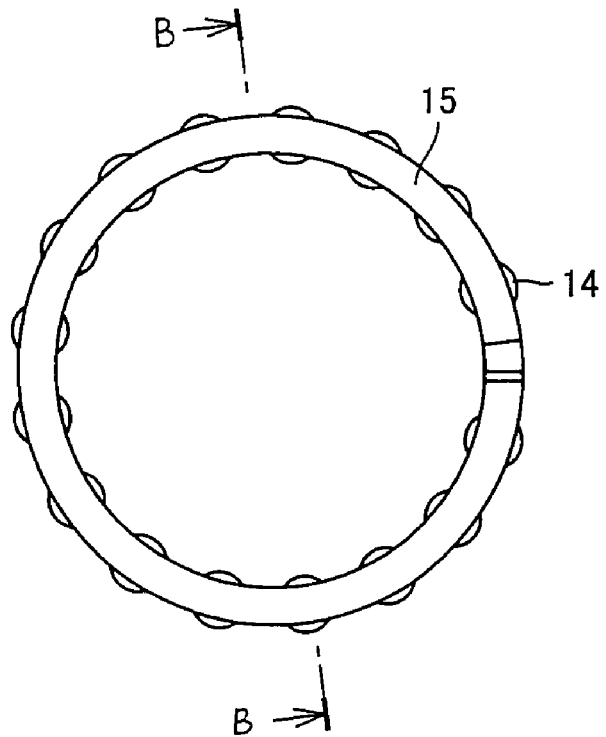
FIG. 6A is a view showing a cage holding rollers.
Figure 6B:
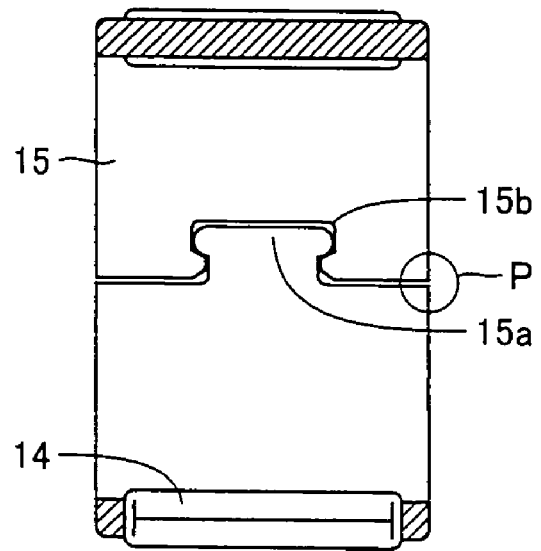
FIG. 6B is a sectional view taken along line B-B in FIG. 6A.

The cage 15 is formed of a resin material and has a plurality of pockets to house the needle rollers 14 in the circumferential direction as shown in FIG. 6A. In addition, as shown in FIG. 6B, a whole configuration of the cage 15 is in shape of C having one split part in the circumferential direction. The cage 15 is elastically deformed to be set in a shaft and then a convex part 15a engages with a concave part 15b at a cut part.

An axial sectional configuration of the cage 15 is the same over the whole circumference and it is almost rectangular except for parts of the pockets. Namely, the cage 15 has a rectangular sectional configuration in the circumferential direction except for the parts of the pockets.

Figure 7:
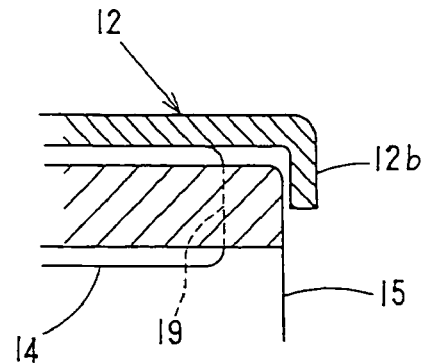
FIG. 7 is a sectional view showing a part engaging with the cage in the split type needle roller bearing.
Figure 9:
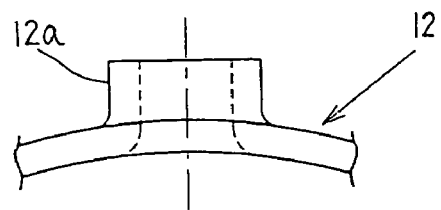
FIG. 9 is a side view showing a positioning projection part of the outer ring in the split type needle roller bearing.
Figure 10A:
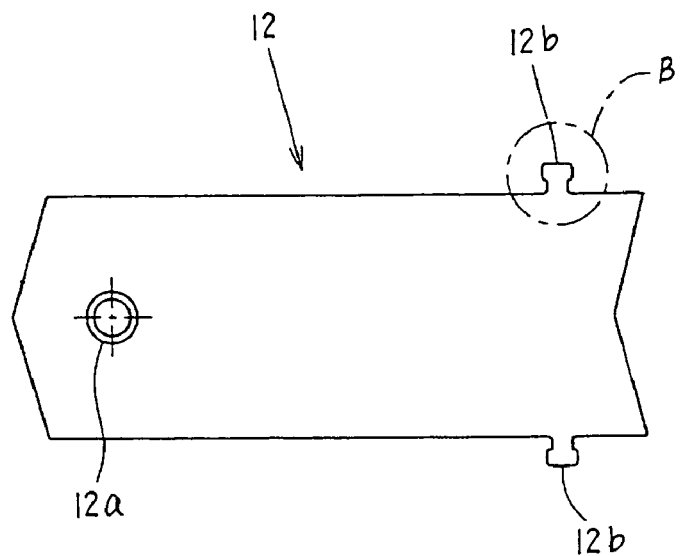
FIG. 10A is a plan view showing a strip blank before a half split which constitutes the outer ring is curved.

The semicircular outer ring member 12 is formed by curving a strip blank pressed from a steel plate, into a semicircle shape as shown in FIG. 10A. One end of the strip blank is in the form of V shape to be a protruding part, and the other end thereof is in the form of inverted V shaped to be a notched part for engagement. The positioning projection 12a shown in FIG. 9 is formed on one surface of the end in the vicinity of the protruding part of the strip blank by a burring process. The strip blank is curved so that this positioning projection 12a protrudes from an outer diameter surface. The engaging clicks 12b are integrally formed on both edges of the end in the vicinity of the notched part of the strip blank so as to protrude in a width direction. These engaging clicks 12b are bent at 90 degrees to the side opposite to the protruding side of the positioning projection 12a. FIG. 7 shows a state in which the engaging click 12b is bent at 90 degrees.

Figure 10B:
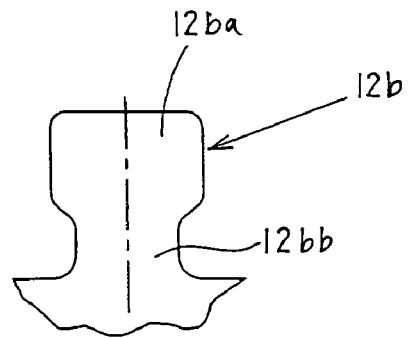
FIG. 10B is an enlarged view of a part B in FIG. 10A.

As shown in FIG. 10B in which a part B in FIG. 10A is enlarged, a bottom part 12bb of the engaging click 12b is narrower in width than a top part 12ba so that the above bending process can be easily performed. The pair of outer ring members 12 and 12 have the same configuration and the cylindrical outer ring 13 having no flange is formed by engaging the protruding part with the notched part of the ends of the split bodies. The engaging part of the engaging projected part and the engaging notched part becomes the split part of the outer ring 13.

The positioning projection 12a is provided in the center of the outer ring member 12 in the width direction so as to be apart from one circumferential end thereof (the protruding part) at an angle of 30° in the circumferential direction. When the positioning projection 12a is provided at this position, the positioning projection 12a can be shifted from a load area at the time of oscillating movement. In addition, the position of the positioning projection 12a in the outer ring member 12 is not limited to the above, so that it may be provided at any position. Although one positioning projection 12a is provided in one outer ring member 12 here, the positioning projections 12a may be provided at two or more positions. Furthermore, the configuration of the positioning projection is not limited to that provided by burring process and may be another shape such as a tub shape.

A description will be made of a positional relation between the positioning projection 12a and the engaging click 12b according to the preferred embodiment in detail below.

According to the needle roller bearing 11 having the above constitution, since a part of the outer ring 13 and a part of the cage 15 are cut, it can be used as a bearing for a crankshaft, a camshaft, a balance shaft, a rocker shaft and the like for a car engine in which assembling cannot be implemented in the axial direction.

Since the split type needle roller bearing has the engaging click 12b which protrudes from the side edge of the outer ring 13 to be in contact with the width surface of the cage 15, the outer ring 13 and the cage 15 are not disassembled in the axial direction during transportation after the bearing is manufactured. In addition, when the bearing is set in the shaft, since the cage 15 is positioned in the axial direction by the engaging click 12b of the outer ring 13, the assembling is easy. Since the outer ring 13 comprises the engaging click 12b, it is not necessary to provide a part for positioning in the cage 15, so that the cage 15 can be simple in configuration. Therefore, since an injection mold of the cage 15 can be simple in configuration and the cage 15 can be manufactured without a complex process, the cage 15 can be manufactured at low cost. Since the sectional configuration of the cage 15 in the axial direction is a simple rectangle in the above embodiment, the structure of the cage 15 can be further simple and it can be manufactured at lower cost.

Although the configuration of the outer ring 13 becomes complicated to some extent due to the engaging click 12b, the engaging click 12b can be easily added to the outer ring 13 by an appropriate manufacturing method. In the case where the outer ring 13 is a shell type, since a progressive press mold is only partially changed as compared with a conventional outer ring process, the cost can be kept low as compared with the case the resin cage becomes a complicated configuration.

In the case where the positioning projection 12a is provided on the outer diameter surface of the outer ring 13, the split type needle roller bearing can be positioned in the housing (not shown) by fitting the positioning projection 12a of the outer ring in a hole and the like provided in the housing. In this case, the housing which supports the split type needle roller bearing may be also a split type.

According to this embodiment, since the engaging click 12b is provided on each side of the semicircular outer ring member 12, the number of the engaging clicks 12b provided in the outer ring 13 is four in total. As another embodiment, one engaging click 12b may be provided on one side of the one half outer ring member 12 and one engaging click 12b may be provided on the other side of the other half outer ring member 12 so that the number of the engaging clicks provided in an outer ring is two in total. The engaging click 12b is not only partially provided in the circumferential direction but also continuously provided over the circumference. In addition, a configuration, a size, and the number of the engaging clicks 12b may be different in each of the pair of outer ring members 12 which constitutes the outer ring 13.

Figure 8A:
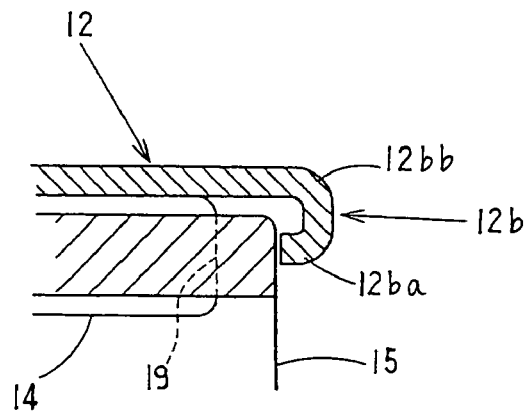
FIG. 8A is a sectional view showing another example of a part engaging with the cage in the split type needle roller bearing.
Figure 8B:
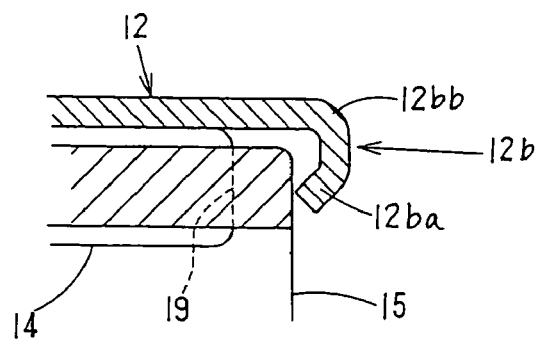
FIG. 8B is a sectional view showing still another example of a part engaging with the cage in the split type needle roller bearing.
Figure 8C:
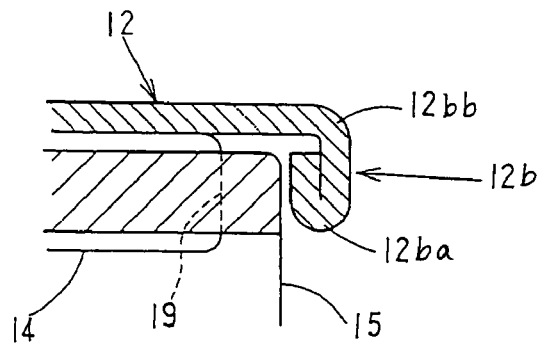
FIG. 8C is a sectional view showing still another example of a part engaging with the cage in the split type needle roller bearing.

Furthermore, the engaging click 12 is not always bent at 90 degrees as shown in FIG. 7, and it may be such that a small width part 12bb and a middle part between the small width part 12bb and an edge part 12ba are bent at 90 degrees to the same side so as to be formed into L shape in section so that an end surface of the edge part 12ba comes in contact with the width surface of the cage 15 as shown in FIG. 8A, for example. In addition, it may be such that the small width part 12bb and the middle part between the small width part 12bb and the edge part 12ba are bent at 90 degrees and 45 degrees, respectively to the same side so as to be formed into J shape in section so that an edge of the edge part 12ba comes in contact with the width surface of the cage 15 as shown in FIG. 8B. Furthermore, it may be such that the small width part 12bb and the middle part between the small width part 12bb and the edge part 12ba are bent at 90 degrees and 180 degrees, respectively to the same side so that the edge part 12ba is folded and this folded part comes in contact with the width surface of the cage 15 as shown in FIG. 8C.

Figure 11:
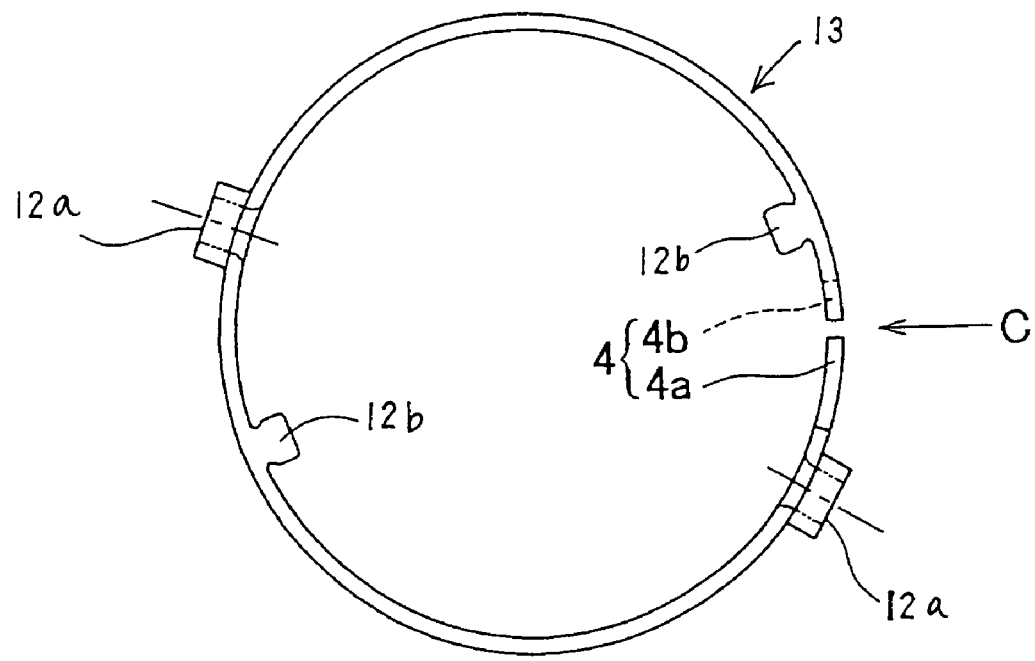
FIG. 11 is a side view showing an outer ring according to another embodiment of the present invention.
Figure 12:
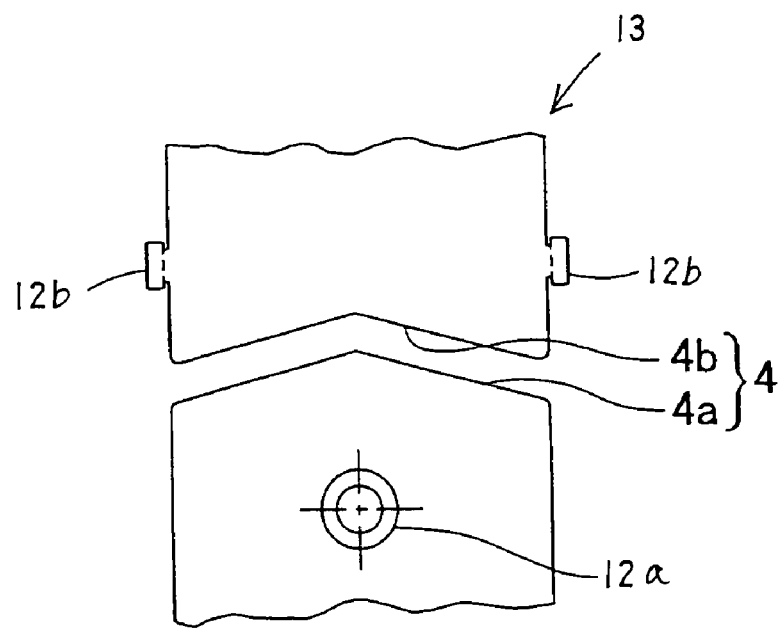
FIG. 12 is an enlarged front view showing a part C in FIG. 11.

Meanwhile, although the outer ring 13 is the two-split type in the above embodiment, the present invention is not limited to this and an outer ring 13 may have one split part 4 in the circumferential direction as shown in FIG. 11. In FIG. 11, the outer ring 13 has one split part 4 so that the whole outer ring 13 is formed into C shape. As shown in FIG. 12 which is an enlarged view showing a part C in FIG. 11, such outer ring 13 is constituted into a cylindrical shape having no flange by engaging a protruding part 4a on one end with a notched part 4b on the other end. Other constitutions are the same as those in the above embodiment.

As described above, according to the preferred embodiment of the present invention, the projection 12a is provided in the outer ring member 12 to prevent the outer ring 13 from rotating in the circumferential direction, and the engaging clicks 12b are provided to prevent the cage 15 from moving in the axial direction.

Here, the outer ring member 12 comprises a middle region 12d in the center in the circumferential direction, which becomes the load region when the bearing is used, and end regions 12e at both ends in the circumferential direction, which become non-load regions when the bearing is used. The projection 12a and the engaging click 12b are positioned at the opposite end regions 12e across the middle region 12d, respectively.

Although the projection 12a and the engaging click 12b may be formed on the same end region, when they are provided at the opposite end regions 12e across the middle region 12d, the projection 12a, the engaging click 12b and the outer ring member 12 are easily processed, respectively.

Furthermore, in the case where the outer ring 13 comprises the two outer ring members 12, when it is assumed that a center angle from an outermost end of the outer ring member 12 is φ in the circumferential direction, the end region 12e is positioned within a range of $5° \leq \phi \leq 45°$.

In order to provide the middle region 12d of the load region as large as possible, the center angle of the end region 12e of the non-load region from the outermost end of the outer ring member 12 has to be set within 45°. Meanwhile, when each of the projection 12a and the engaging click 12b positioned in the end region 12e is too close to the outermost end 12c of the outer ring member 12 in the circumferential direction, they are affected by curving stress when the plate-shaped outer ring member 12 is curved into an arc shape, so that the center angle of them from the circumferential outermost end 12c toward the middle region 12d is to be 5° or more.

The outer ring member 12 of the needle roller bearing 11 is formed of a material which contains 0.15% to 1.1% by weight of carbon. For example, it is SCM415 or S50C and the like. Since these materials have a high carbon content, an effective hardening depth is increased by a heat treatment. As a result, hardness (Hv 653 or more) required for the outer ring member 12 can be provided by a carburized quenching process. Since an equipment for the carburized quenching process is inexpensive as compared with a carburized nitriding process equipment, the needle roller bearing can be manufactured at low cost. However, when a material contains more than 1.1% by weight of carbon, since its workability is lowered, that material is not suitable for the outer ring member 12 which is manufactured by a pressing process and the like.

When the outer ring member 12 is formed of a material which contains 0.5% or more by weight of carbon such as SAE1070 or SK5, sufficient hardness can be provided by a bright quenching process or a high-frequency quenching process. An equipment of the bright quenching or the high-frequency quenching process is inexpensive as compared with the equipment of the carburized nitriding process or the carburized quenching process, and since the high-frequency quenching process does not use gas, its equipment is an environment-friendly equipment.

Although the outer ring 13 comprises two outer ring members 12 split in the diameter direction in the above embodiment, the present invention is not limited to this and it may be split into any number.

Although each of the projection 12a and the engaging click 12b is provided at one position in each outer ring member 12 in the above embodiment, the present invention is not limited to this and each of them may be provided at one position in the entire outer ring 13 or may be provided at a plurality of positions in each outer ring member 12.

In addition, although the engaging click 12b is provided at a part of the axial end the outer ring member 12 in the above embodiment, an engaging click 12b may be provided over the entire axial end of the outer ring member 12. In this case, since the cage 15 is not caught by a side face of the engaging click 12b, even when the engaging click 12b is positioned in the load region, a rotation defect and the like are not generated.

Furthermore, the cage 15 may be formed by pressing a metal material instead of being formed of the resin, or the cage 15 may not be provided.

Figure 13A:
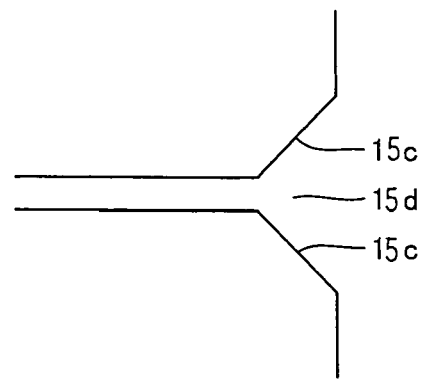
FIG. 13A is a view corresponding to an enlarged view of a part P in FIG. 6B and a view showing a configuration of a chamfered part provided on a width-direction end surface of an abutting surface.

Characteristics in another embodiment of the present invention will be described with reference to FIGS. 13A to 15B. As shown in FIG. 13A which corresponds to an enlarged view showing a part P in FIG. 6B, a chamfered part 15c is provided at a width-direction end surface of an abutting part of a cage 15.

According to the above cage 15, one of cut surfaces is prevented from being shifted in the axial direction by the fitting parts comprising a convex part 15a and a concave part 15b. In addition, even when one side of the abutting part is shifted in the axial direction to some extent, since the chamfered part 15c is provided at the width-direction end of the abutting part, the cage 15 can be prevented from being caught by the engaging click 12b.

Figure 14A:
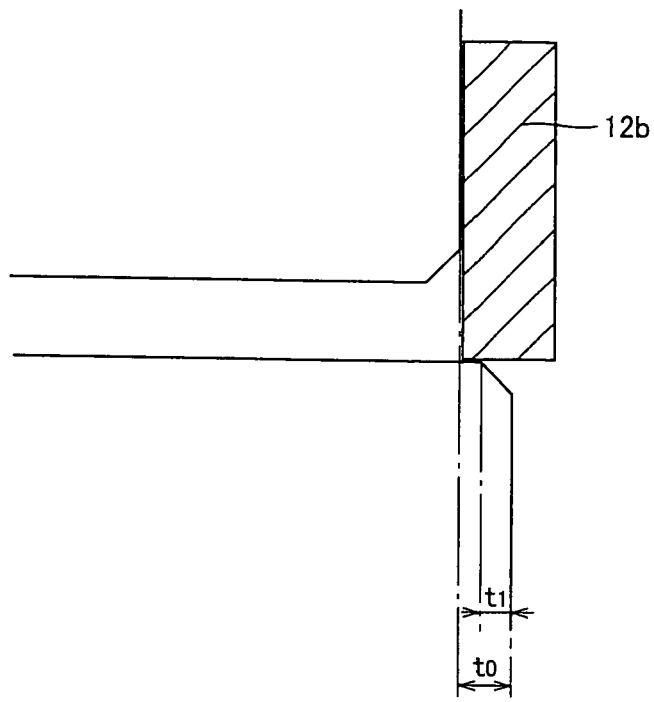
FIG. 14A is a view corresponding to an enlarged view of a part P in FIG. 6 and a view showing a dimensional relation between an axial length of a chamfered part and allowance of a fitting part.
Figure 14B:
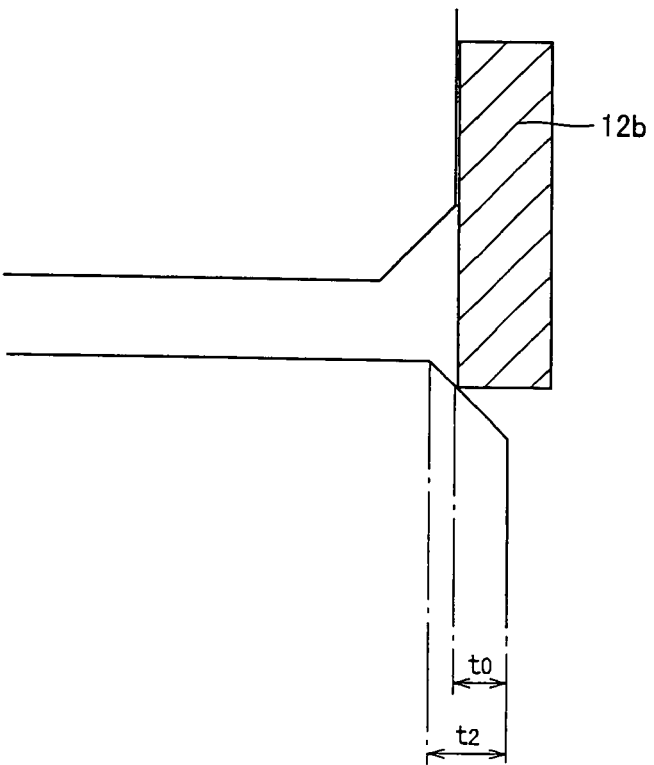
FIG. 14B is a view showing a dimensional relation between the axial length of the chamfered part and the allowance of the fitting part.

However, the fitting parts need to have some allowance in view of manufacturing and maximum allowance is determined by allowance of the engaging part of the cage. As shown in FIG. 14A, when axial allowance $t_0$ of the fitting part is larger than an axial length $t_1$ of the chamfered part 15c, the cut surface could be caught by the engaging click 12b to hinder the smooth rotation of the bearing. Thus, as shown in FIG. 14B, an axial width $t_2$ of the chamfered part 15c is set to be larger than the axial allowance $t_0$ of the engaging part to prevent the catching of the engaging click 12b.

Figure 15A:
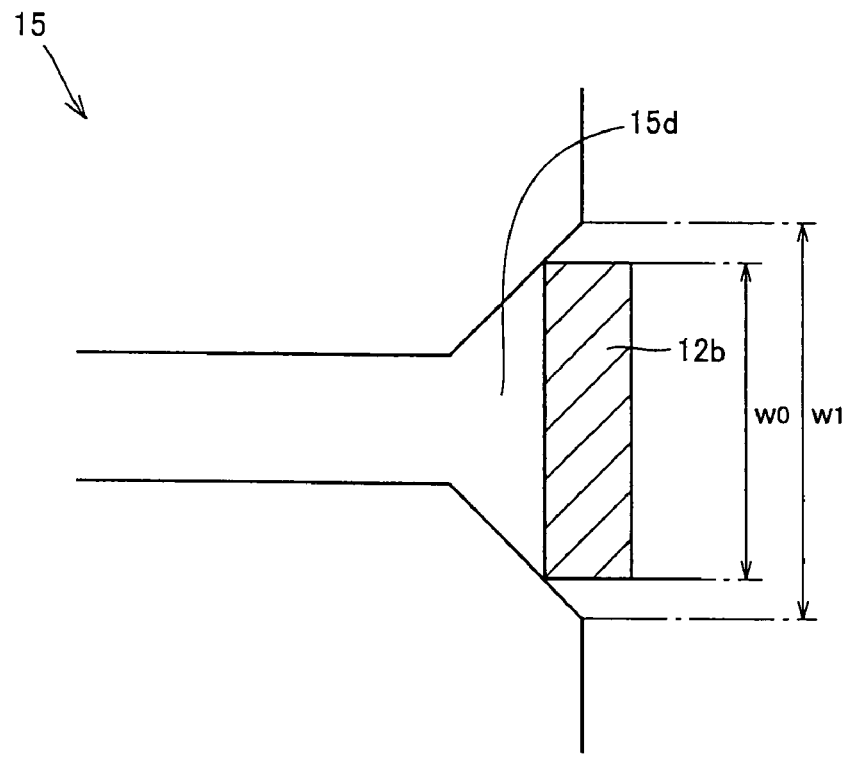
FIG. 15A is a view corresponding to an enlarged view of a part P in FIG. 6 and a view showing a dimensional relation between a circumferential length of the chamfered part and a circumferential length of the engaging click.
Figure 15B:
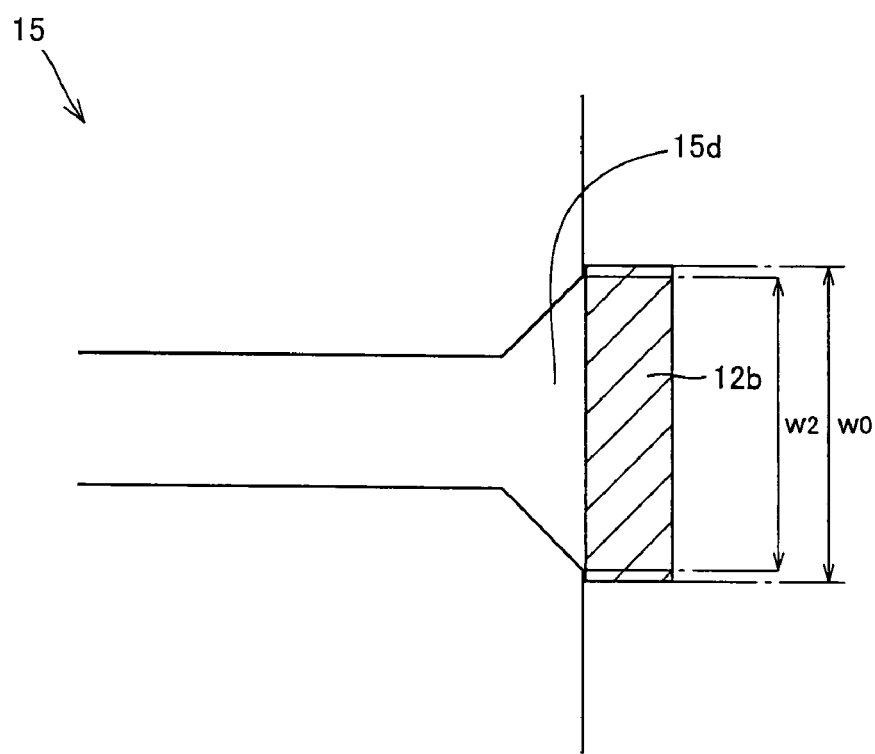
FIG. 15B is a view showing a dimensional relation between the circumferential length of the chamfered part and the circumferential length of the engaging click.

Furthermore, a recessed part 15d is provided by the chambered parts 15c on both sides of the cut faces. At this time, when a circumferential length $w_1$ of the chambered part 15c is larger than a circumferential length $w_0$ of the engaging click 12b, the engaging click 12b could fall into the recessed part 15d to hinder the smooth rotation of the bearing as shown in FIG. 15A. Thus, as shown in FIG. 15B, such problem can be avoided by setting a circumferential length $w_2$ of the chamfered part 15c to be smaller than the circumferential length $w_0$ of the engaging click 12b.

Figure 13B:
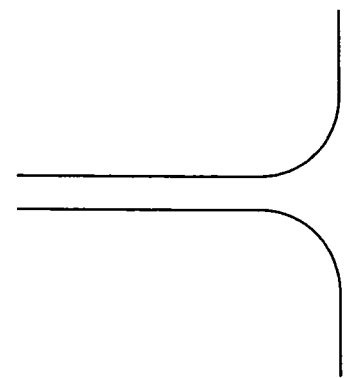
FIG. 13B is a view showing another example of the chamfered part.
Figure 13C:
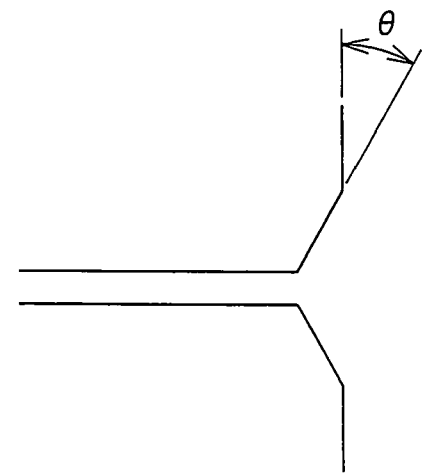
FIG. 13C is a view showing still another example of the chamfered part.

In addition, although the chamfered part 15c is C-chamfering in the above embodiment as shown in FIG. 13A, the present invention is not limited to this, and it may be R-chamfering as shown in FIG. 13B or an end surface may be cut at a predetermined angle of θ as shown in FIG. 13C.

Furthermore, although the fitting parts comprise the convex part 15a and the concave part 15b in the above embodiment, the present invention is not limited to this and the fitting part may comprise a plurality of combined convex parts and concave parts.

Figure 16A:
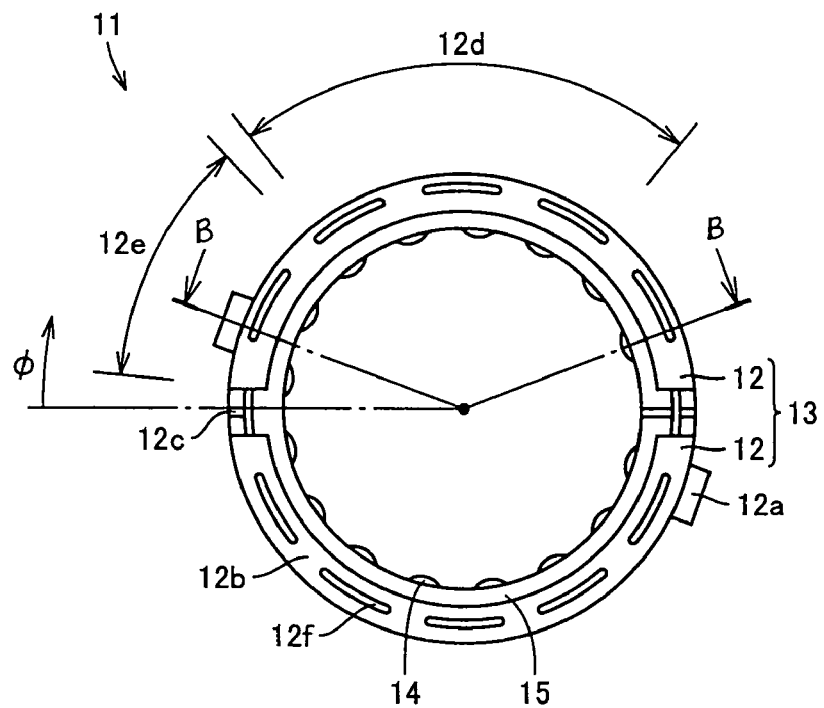
FIG. 16A is a front view showing a needle roller bearing according to another embodiment of the present invention.
Figure 16B:
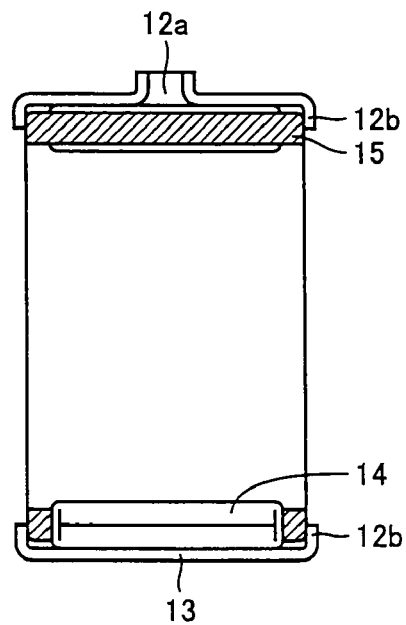
FIG. 16B is a sectional view taken along line B-B in FIG. 16A.
Figure 17A:
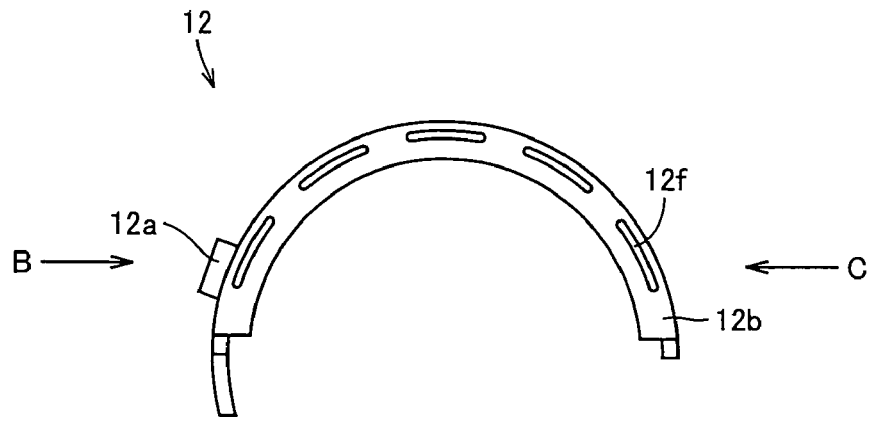
FIG. 17A is a front view showing an outer ring member of the needle roller bearing according to another embodiment of the present invention.
Figure 17B:
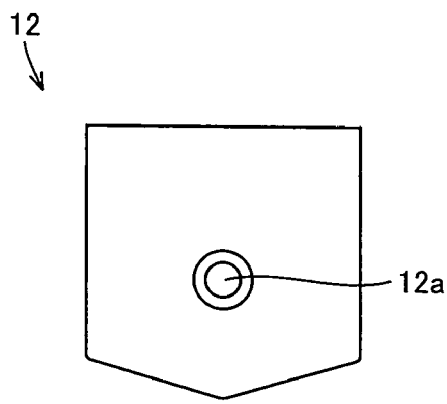
FIG. 17B is a view showing the outer ring member taken in a direction of arrow B in FIG. 17A.
Figure 17C:
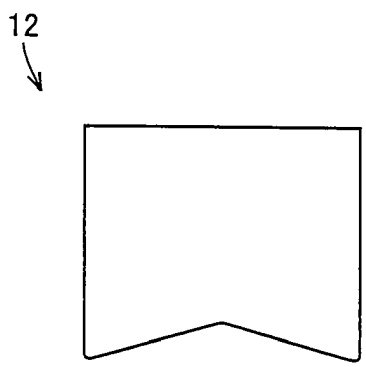
FIG. 17C is a view showing the outer ring member taken in a direction of arrow C in FIG. 17A.

A needle roller bearing 11 according to still another embodiment of the present invention will be described with reference to FIGS. 16A to 18C. An engaging click 12b is provided over an entire width-direction end of the outer ring member 12 and through holes 12f are provided in base parts of the engaging click 12b at regular intervals as shown in FIG. 16A. In addition, as shown in FIGS. 17A and 17B, one end of the outer ring member 12 has a convex configuration and the other end thereof has a concave configuration and a cylindrical outer ring 13 can be formed by connecting the two convex and concave configurations of the outer ring members 12. Here, a split line of the outer ring 13 does not have to coincide with an axial direction strictly as long as the outer ring 13 can be split along a diameter.

The above outer ring member 12 is formed by pressing a strip material such as a cold rolled steel plate. According to its processing order, the engaging click 12b is bent in a thickness direction of the outer ring member 12, and the whole outer ring member 12 is curved at a predetermined curvature, for example. As a result, the engaging click 12b could be deformed because it receives compressive stress in the curving process of the outer ring member 12.

Therefore, the hole 12f is formed at the base part of the engaging click 12b. Thus, since the compressive stress can be absorbed or alleviated because the hole 12f is deformed when the outer ring member 12 is curved, the engaging click 12b can be prevented from being deformed.

In addition, since the engaging click 12b is provided over the entire width-direction end of the outer ring member 12, the cage 15 is not caught by an end surface of the engaging click 12b. As a result, smooth rotation of the needle roller bearing 11 can be ensured.

At this time, in order to alleviate large compressive stress generated at each part of the engaging click 12, the hole 12f is to be a long hole in the circumferential direction so as to be able to absorb the compressive stress. Furthermore, in order to uniformly absorb the compressive stress at each part of the engaging click 12b, the plurality of holes 12f are to be provided.

Although the engaging click 12b is provided over the entire width-direction end of the outer ring member 12 in the above embodiment, the present invention is not limited to this, so that the engaging click 12b may be divided at parts of the outer ring member 12 to provide a plurality of engaging clicks in the circumferential direction. In this case, at least one hole 12f is provided at a base part of each engaging click 12b.

Figure 18A:
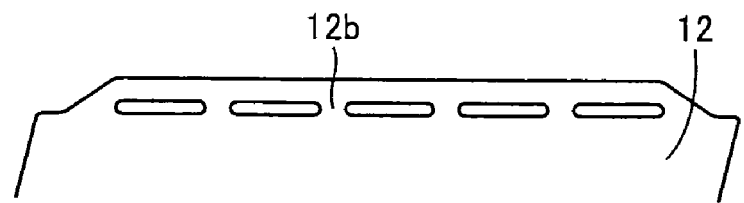
FIG. 18A is a view showing a state in which a long hole is provided at a base part of an engaging click of the outer ring member.
Figure 18B:
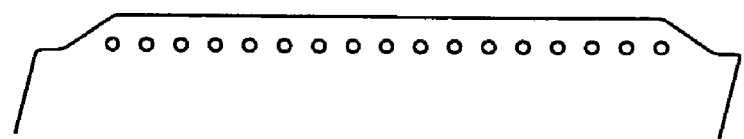
FIG. 18B is a view showing a state in which a round hole is provided at a base part of an engaging click of the outer ring member.
Figure 18C:
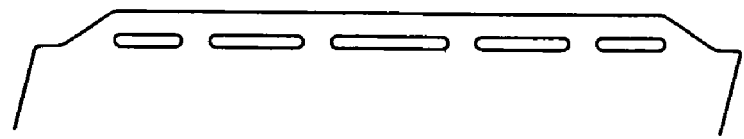
FIG. 18C is a view showing a state in which a hole which is different in size is provided at a base part of an engaging click of the outer ring member.

In addition, although the hole 12f provided at the base part of the engaging click 12b is a long hole in the above embodiment, the present invention is not limited to this, so that it may be a round hole as shown in FIG. 18B, or a plurality of holes having different sizes may be formed depending on a degree of compressive stress. Thus, the hole 12f may take any form so as to absorb the compressive stress generated in the engaging click 12b.

Furthermore, although the plurality of holes 12f are arranged at the regular intervals in the above embodiment, the present invention is not limited to this, so that at a place where great compressive stress is generated, many holes 12f are provided and at a place where only small compressive stress is generated, the number of the holes 12f may be reduced.

Figure 19:
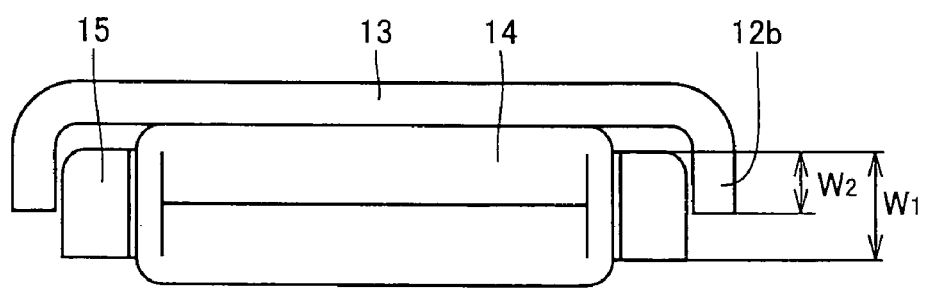
FIG. 19 is a view showing a relation between the cage and the engaging click in the needle roller bearing according to one embodiment of the present invention.
Figure 20:
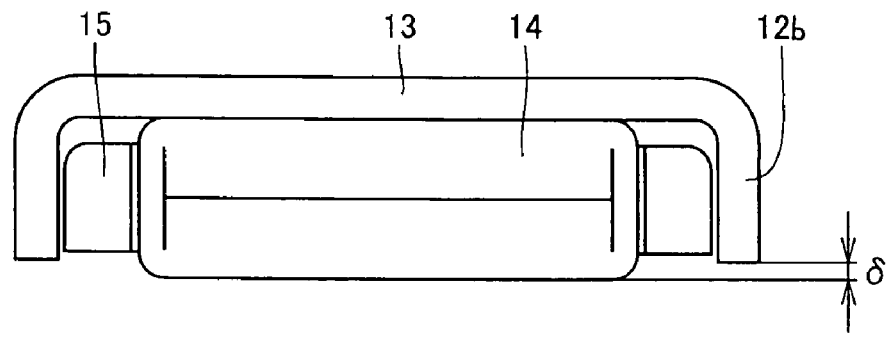
FIG. 20 is a view showing a relation between the cage and the engaging click in the needle roller bearing according to another embodiment of the present invention.

A needle roller bearing 11 according to still another embodiment of the present invention will be described with reference to FIGS. 19 and 20. In the embodiment shown in FIG. 19, a diameter-direction width $w_1$ of a cage 15 and an engaging width $w_2$ between an engaging click 12b and the cage 15 are set such that $w_2/w_1 > 0.2$. Thus, even when great axial load is applied to the needle roller bearing 11, the engaging click 12b is large enough to prevent the cage 15 from escaping and falling down.

In addition, a diameter-direction clearance δ between an end of the engaging click 12b and an inner diameter surface of the needle roller bearing 11 is such that δ>0.1 mm. Thus, eve when the shaft is tilted, interference between the engaging click 12b and the shaft can be prevented.

Furthermore, although the engaging click 12b is provided at one part of an axial end of the outer ring member 12 in the above embodiment, the engaging click 12b may be provided over an entire axial end of the outer ring member 12.

Figure 21A:
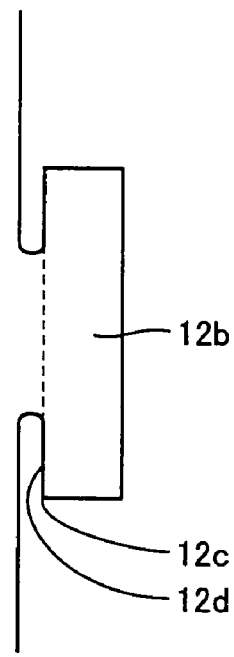
FIG. 21A is a view showing an engaging click.
Figure 21B:
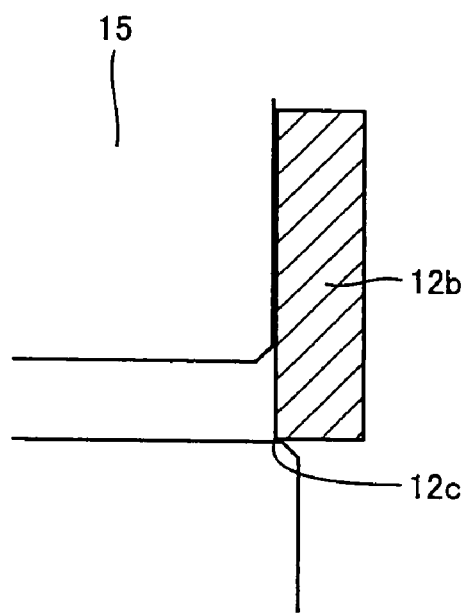
FIG. 21B is a view showing a positional relation between the engaging click and the cage.

A needle roller bearing according to still another embodiment of the present invention will be described with reference to FIGS. 21A to 23B. As described above, the projection 12a is provided in the outer ring member 12 to prevent the outer ring 13 from rotating in the circumferential direction, and the engaging click 12b is provided to prevent the cage 15 from moving in the axial direction. Here, as shown in FIG. 21A, in a case where a surface 12c of an engaging click 12 opposed to a cage 15 is a flat surface, when axial load is applied to the needle roller bearing 11, it is likely that an abutting part of the cage 15 is shifted in the axial direction and one side is caught by a corner part 12c of the engaging click 12b. FIG. 21B shows this state. This causes a rotation defect of the needle roller bearing 11.

Figure 22A:
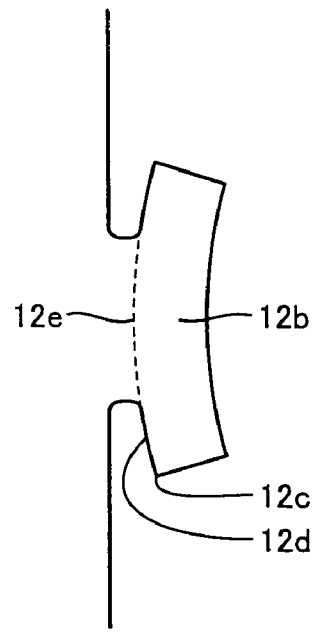
FIG. 22A is a view showing a preferred engaging click.
Figure 22B:
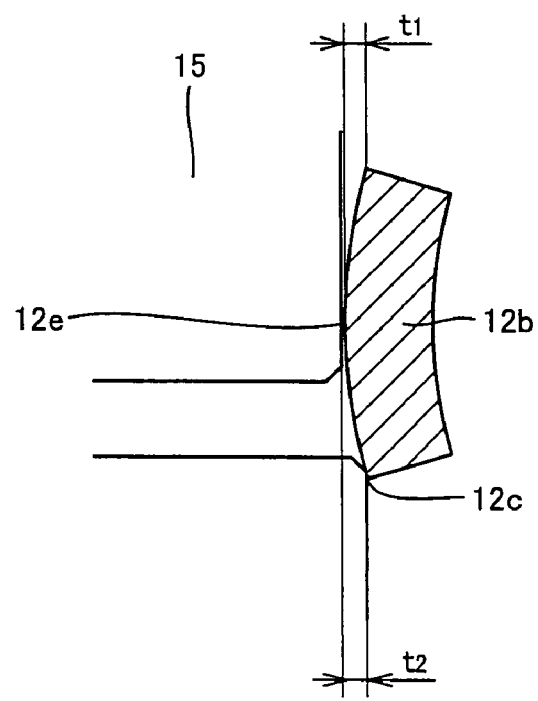
FIG. 22B is a view showing a positional relation between the engaging click and the cage.

Thus, according to an engaging click 12b of a needle roller bearing in this preferred embodiment of the present invention, as shown in FIG. 22A, a surface 12d opposed to a cage 15 is a curved surface in which a center part 12e protrudes. Thus, since the center part 12e protrudes toward the cage with respect to both sides in the surface 12d of the engaging click 12b opposed to the cage 15, the cage 15 can be prevented from being caught by the corner part 12c as shown in FIG. 22B.

Meanwhile, a certain degree of allowance is needed at an abutting part of the cage 15 in view of manufacturing. Thus, as shown in FIG. 22B, a projection amount $t_1$ of the center part 12e of the engaging click 12b is set to be larger than axial allowance $t_2$ of the abutting part to prevent the cage 15 from being caught by the corner part 12c even when the abutting part of the cage 15 is maximally shifted.

Figure 23A:
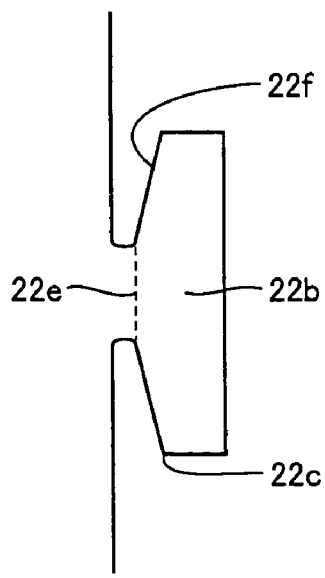
FIG. 23A is a view showing a preferred engaging click.
Figure 23B:
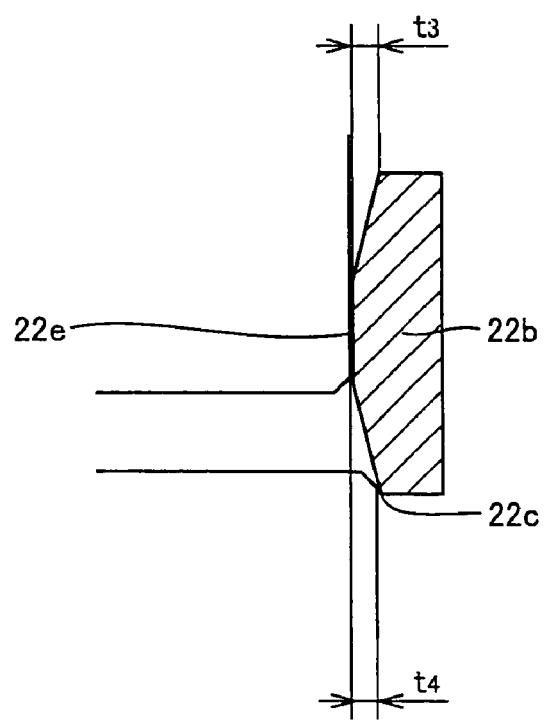
FIG. 23B is a view showing a positional relation between the engaging click and the cage.

In addition, although the surface 12d of the engaging click 12b opposed to the cage 15 is curved in the above embodiment, the present invention is not limited to this, so that a tapered part 22f may be provided at both ends, and the tapered part 22f may be flat or curved as shown in FIGS. 23A and 23B. In this case also, a projection amount $t_3$ of a center part 22e is set to be greater than an axial allowance amount $t_4$ of a cage 25. Furthermore, the same effect can be expected in any configuration as long as the center part 12e protrudes with respect to both ends in the surface 12d of the engaging click 12b opposed to the cage 15.

Figure 24:
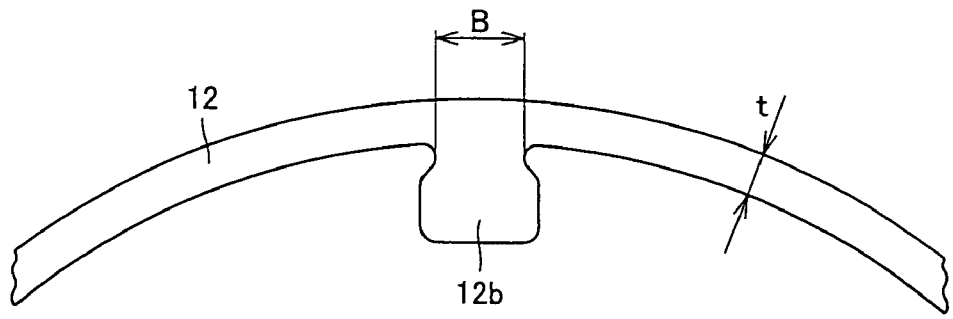
FIG. 24 is a view showing a relation between a thickness of the outer ring member and a base width of the engaging click used in the needle roller bearing according to one embodiment of the present invention.
Figure 26:
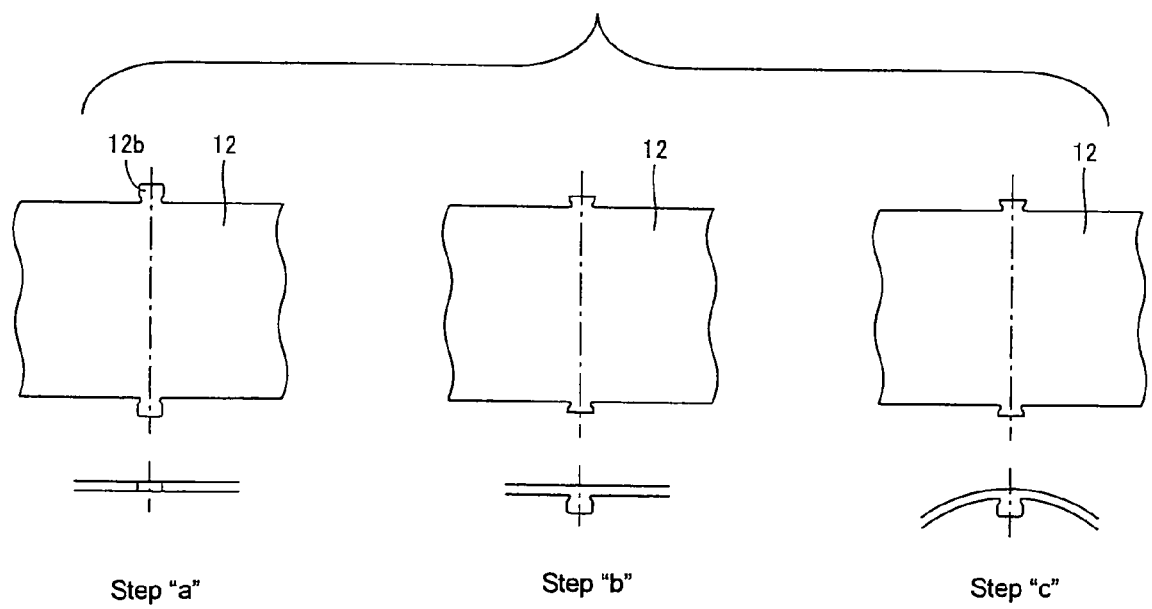
FIG. 26 is a view showing a part of manufacturing steps of the needle roller bearing according to one embodiment of the present invention.

A manufacturing method of the needle roller bearing according to one embodiment of the present invention will be described with reference to FIG. 24. The outer ring member 12 is manufactured in orders shown in FIG. 26, for example. First, an outline of the outer ring member 12 is formed by a punching process at step "a", the engaging click 12b is bent in a thickness direction of the outer ring member 12 by a bending process at step "b", and the outer ring member 12 is curved at a predetermined curvature at step "c".

If the outer ring member 12 is curved (step "c") first, the outer ring member 12 could be deformed when the engaging click 12b is bent (step "b"), so that smooth rotation of the needle rollers could be hindered.

In the case where the outer ring member 12 is manufactured by the above method, when a base width of the engaging click 12b is large, rigidity of the base part 12c becomes high, so that the outer ring member 12 could be deformed such that it is undulated, for example. Thus, as shown in FIG. 24, a plate thickness "t" of the outer ring member 12 and a base width B of the engaging click 12b are set to such that $1.0 \leq B/t \leq 4.0$ to prevent the outer ring member 12 from being deformed.

Figure 25A:
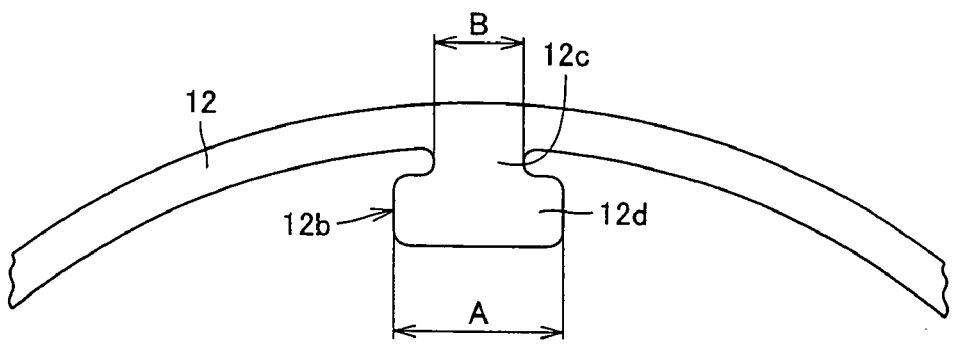
FIG. 25A is a view showing a relation between a base part and a guide part of the engaging click provided for the outer ring of the needle roller bearing according to another embodiment of the present invention.

Furthermore, as shown in FIG. 25A, the engaging click 12b has a base part 12c in the vicinity of the outer ring member 12 and a guide part 12d for preventing the cage 15 from moving in the axial direction. Here, the guide part 12d needs to have some degree of hardness to prevent the cage 15 from moving. In addition, when a width of the guide part 12d is too large as compared with the base part 12c, the cage 15 could come in contact with an end of the guide part 12 to cause the engaging click 12b to be deformed and the like when the bearing is rotated.

Figure 25B:
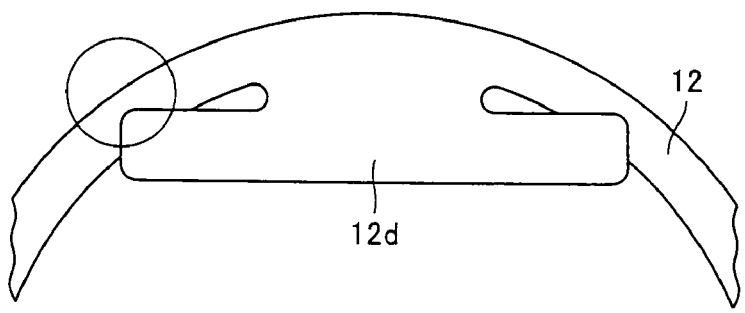
FIG. 25B is a view showing a relation between the base part and the guide part of the engaging click.

Thus, a width A of the guide part 12d and the width B of the base part 12c are set such that $1 \leq A/B \leq 3$. Furthermore, in view of manufacturing, the width of the guide part 12d is set such that it may not come in contact with the outer ring member 12 as shown in FIG. 25B.

INDUSTRIAL APPLICABILITY

The present invention is advantageously applied to a needle roller bearing which supports a crankshaft, a camshaft, a balance shaft, and a rocker shaft in a car.

Although the embodiments of the present invention have been described with reference to the drawings in the above, the present invention is not limited to the above-illustrated embodiments. Various kinds of modifications and variations may be added to the illustrated embodiments within the same or equal scope of the present invention. Furthermore, characteristics of each embodiment can be arbitrarily combined.

What is claimed is:

1. A split type needle roller bearing comprising:
   an outer ring having a split part in a circumferential direction;
   a plurality of rollers which can roll along an inner diameter surface of the outer ring; and
   a cage holding the plurality of rollers, characterized in that
   said outer ring has an engaging click protruding inward along a diameter at a width-direction end thereof to prevent said cage from moving in an axial direction, wherein
   said outer ring comprises a plurality of outer ring members split by split lines extending in the axial direction of the bearing,
   said outer ring member has said engaging click and an engaging part engaging with a housing for positioning in positions shifted from its circumferential center, and
   said outer ring member contains 0.15% to 1.1% by weight of carbon, and further wherein
   said outer ring member has a middle region positioned in its circumferential center to be a load region while the bearing is used, and end regions positioned its circumferential ends to be non-load regions while the bearing is used, and
   said engaging part and the engaging click are positioned in said end regions opposed across said middle region.

2. The needle roller bearing according to claim 1, wherein said outer ring has a cylindrical configuration having no flange, and
   said engaging click is provided at a part of a side edge of said outer ring extending circumferentially.

3. The needle roller bearing according to claim 1, wherein said engaging click is provided at a position suitable for retaining lubrication oil in said outer ring.

4. The needle roller bearing according to claim 3, wherein said engaging click is provided at a lowermost position of the bearing when the bearing is used.

5. The needle roller bearing according to claim 1, wherein said cage is formed of a resin, and
   a sectional configuration of said cage in the axial direction is almost rectangular.

6. The needle roller bearing according to claim 1, wherein said outer ring has a positioning projection on its outer diameter surface to engage with a housing for positioning.

7. The needle roller bearing according to claim 1, wherein said cage is split at one or two positions in the circumferential direction.

8. The needle roller bearing according to claim 1, wherein said outer member is treated with a high-frequency quenching process or a bright quenching process, and
   said outer ring member contains 0.5% to 1.1% by weight of carbon.

9. The needle roller bearing according to claim 1, wherein said outer ring comprises a plurality of outer ring members split by split lines extending in the axial direction of the bearing,
   said outer ring member has said engaging click, and
   said cage has an abutting part in which surfaces cut in the axial direction abut on each other, and a chamfered part positioned on a width-direction end surface of said abutting part.

10. The needle roller bearing according to claim 9, wherein said abutting part has fitting parts to prevent the cage from being shifted in the axial direction, and
    an axial length of said chamfered part on the cut surface is larger than axial allowance of said abutting part.

11. The needle roller bearing according to claim 9, wherein a circumferential maximum length of said chamfered part is smaller than a circumferential length of said engaging click.

12. The needle roller bearing according to claim 1, wherein said outer ring comprises a plurality of outer ring members split by split lines extending in the axial direction of the bearing, and
    said outer ring member comprises said engaging click and a through hole piercing said engaging click.

13. The needle roller bearing according to claim 12, wherein
    said engaging click is arranged over a whole width-direction end of said outer ring member.

14. The needle roller bearing according to claim 12, wherein
    said hole is a long hole which is long in a circumferential direction.

15. The needle roller bearing according to claim 12, wherein
    said holes are provided at a plurality of positions in the circumferential direction.

16. The needle roller bearing according to claim 12, wherein
    said hole is not provided at a region in which the lubrication oil stays in said outer ring.

17. The needle roller bearing according to claim 1, wherein said outer ring comprises a plurality of outer ring members split by split lines extending in the axial direction of the bearing, and
    a diameter-direction width $w_1$ of said cage and an engaging width $w_2$ between said engaging click and said cage has a relation such that $w_2/w_1 > 0.2$.

18. The needle roller bearing according to claim 17, wherein a diameter-direction clearance between an end of said engaging click and an inner diameter surface of said needle roller bearing is larger than 0.1 mm.

19. The needle roller bearing according to claim 1, wherein
said outer ring comprises a plurality of outer ring members split by split lines extending in the axial direction of the bearing, and
a surface of said engaging click opposed to said cage has a configuration in which its center part protrudes toward the cage with respect to both ends thereof.

20. The needle roller bearing according to claim 19, wherein
the surface of said engaging click opposed to said cage is a curved surface in which said center part protrudes.

21. The needle roller bearing according to claim 19, wherein
the surface of said engaging click opposed to said cage has a chamfered part at said both ends.

22. The needle roller bearing according to claim 19, wherein
said cage has an abutting part in which surfaces cut in the axial direction abut on each other, and
a protruding amount of said center part is larger than axial allowance of said abutting part.

23. The needle roller bearing according to claim 1, wherein
said outer ring comprises a plurality of outer ring members split by split lines extending in the axial direction of the bearing, and
a thickness "t" of said outer ring member and a base width B of said engaging click has a relation such that $1.0 \leqq B/t \leqq 4.0$.

24. The needle roller bearing according to claim 1, wherein
said outer ring comprises a plurality of outer ring members split by split lines extending in the axial direction of the bearing,
said engaging click has a base part in the vicinity of said outer ring member, and a guide part preventing said cage from moving in the axial direction, and
a width A of said guide part and a base width B of said base part has a relation such that $1 \leqq A/B \leqq 3$.

25. The needle roller bearing according to claim 24, wherein
said guide part does not come in contact with said outer ring member.

* * * * *